July 24, 1956
F. KOCKS
2,756,137
METHOD FOR THE DIRECT PRODUCTION
OF IRON AND STEEL FROM ORES
Filed Jan. 13, 1953
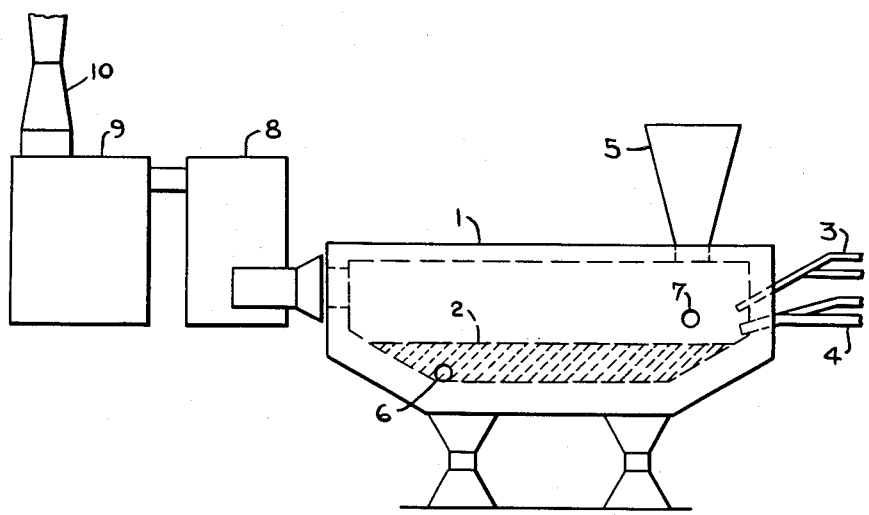
INVENTOR:
FRIEDRICH KOCKS,
BY *Freeman & Manwell,*
*His Agents.*

United States Patent Office 2,756,137
Patented July 24, 1956

2,756,137

METHOD FOR THE DIRECT PRODUCTION OF IRON AND STEEL FROM ORES

Friedrich Kocks, Dusseldorf, Germany

Application January 13, 1953, Serial No. 331,031

6 Claims. (Cl. 75—40)

This invention relates to the direct production of iron and steel from ores; it represents a further development of the method for producing iron and steel, forming the subject matter of my copending patent application Serial No. 323,555, filed December 2, 1952.

In conformity with my pending patent application, mixtures of iron ore and fluxes are directly applied onto the surface of an electrically heated carbon rich iron melt at a timely rate which guarantees the continuous reduction and melting of the iron containing charge, an amount of iron being entered into the molten bath corresponding to the amount of "liquefied carbon" or carbon dissolved in the melt which is required for the reduction of the ore.

This carbon may, in the solid or gaseous state, be either blown or pressed into the molten bath.

In conformity with a particularly successful embodiment of my prior process adjustable carbon electrodes are used for the carbonization of the molten iron which electrodes reach into the bath and supply the amounts of carbon required for the reduction of the ore.

The molten bath may be continuously or periodically tapped. If shortly before the tapping of the iron bath the supply of carbon is interrupted and the ore supply is continued the molten iron is oxidized to form steel, is partially emptied and the remnant of the melt is carbonized by a further admixture of carbon.

In conformity with further experience it was found that this process for the direct production of iron and steel from the ore and based on the use of a molten highcarbonized iron bath as a reducing medium may be advantageously carried-out in a reverberatory furnace either heated from one side or both sides and preferably in a tiltable Siemens-Martin furnace.

Whereas in an electrode furnace the large quantities of carbon monoxide produced by the reduction of the ore must be continuously removed, burned outside of the furnace and used preferably for the generation of current, this gas may be directly burned in the Siemens-Martin furnace together with further heating gases by means of preheated and oxygen enriched surplus air or directly by means of preheated oxygen. If a onesidedly heated reverberatory furnace is used, the hot waste gases are conducted into recuperators for the purpose of preheating the combustion air or the oxygen or both.

In a reverberatory or Siemens-Martin furnace, operated as above described, the enrichment of the molten metal with carbon may be attained by blowing or pressing into the molten bath solid or gasified carbon; adjustable carbon electrodes reaching into the metal bath may also be used, the electrodes being protected by fire-proof coatings, for instance of dolomite or magnesite masses against the attack of the oxidizing flame gases.

In a onesidedly heated reverberatory furnace the electrodes may be arranged in such a manner that the supply of the heating gases and of the combustion air or oxygen takes place outside of the operative confines of the electrodes.

Moreover, in using a reverberatory or a tiltable Siemens-Martin furnace the carbon required for the reduction of the ore may be entered into the melt by removing from the same, periodically or continuously, a quantity of metal, which corresponds to the loss of carbon from the entire melt in the corresponding time, enriching this metal bath portion with carbon outside of the furnace and returning the same into the process.

During the further production of the steel more carbonpoor metal is removed, continuously or interruptedly, from the melt as liquefied carbon or as carbonized iron which must be returned into the furnace. The excess quantity of the carbon-poor metal may either be directly cast or finished in a second aggregate.

If steel is produced intermittently the melt is carbonized in the reverberatory furnace either by carbonizing electrodes or by blowing or pressing into the melt gaseous or solid carbon or by the return of carbonized metal for a period of time until the desired quantity of ore is reduced and converted into iron. Hereafter the carbonizing step is interrupted and the melt is by admixture of ore reduced in the desired carbon percentage. The steel may now be tapped from the furnace and the furnace emptied, while a sump is retained for later carbonization.

During the performance of the process in a onesidedly or twosidedly heated reverberatory furnace carbon powder is preferably blown onto the slag during the reduction. In this manner, reaction is accelerated and the iron loss in the slag is reduced, the latter being continuously exposed to the reducing action of the finely divided carbon.

The heating of the reverberatory or of the SiemensMartin furnace is preferably attained by carbon rich gases such as methane, oil or natural gas; however, also a direct coal dust may be used.

The invention will now be described more in detail and with reference to the accompanying drawing, showing a preferred embodiment thereof.

Molten high carbonized crude iron 2 is charged into the onesidedly heated reverberatory furnace 1 up to about 50 per cent of its capacity; the crude iron may be produced from scrap, carbon and solid iron. The furnace is heated by a burner 3 preferably with high quality natural gas or with methane; oil or coal dust burners may also be used. Air, oxygen, enriched air or oxygen, which are highly preheated in the recuperator 9, are added in excess in order to burn in the furnace the carbon monoxide produced by the reduction of the ore and to utilize it in the furnace. The waste heat of the furnace may be used for the generation of electrical energy, to be used for instance, in the production of oxygen.

The ore to be reduced and the fluxes are supplied by means of the charging device 5 into the furnace and on top of the liquid, high carbonized iron melt. The ore may also be briquetted and carbon and fluxes may be added to the briquettes.

Coal dust together with methane ($CH_4$) is blown into the slag through nozzle 4, preferably at a pressure that at the same time carbon penetrates into the molten metal bath.

The furnace is operated in the following manner.

An amount of carbon is continuously entered into the molten metal bath while simultaneously charging the ore in proportion to its being used-up by reduction; the carbon may be supplied by blowing or pumping into the bath or by carbon electrodes. As soon as a quantity of crude iron has been produced from the ore, which corresponds to the furnace capacity, the supply of carbon to the bath is interrupted while continuing the ore supply; the bath is oxidized until a steel with a predetermined percentage of carbon is produced.

The furnace is emptied with the exception of a small sump or remnant and the process is continued upon carbonization of this remnant sump.

If a circuit procedure is used the operation of the furnace can be performed in such a manner that the oxidized crude iron is continuously or discontinuously discharged from the furnace, is only partly carbonized and returned into the furnace whereas the residual portion is outside of the furnace converted into steel.

The circuit of the iron may be effected by means of a ladle, wherein also a carbonization is performed or by an intermediary vessel into which the ladle currently empties the iron to be carbonized and where in this case also the carbonization itself takes place.

The iron is charged into the reverberatory furnace at 7 and is emptied at 6; moreover, a dust separator 8 is provided between the furnace 1 and the gas discharge dust 10.

Since certain changes in carrying out the above process could be made without departing from the scope thereof, it is intended that all matter contained in the above description or shown in the accompanying drawing shall be interpreted as illustrative and not in a limiting sense.

I claim:

1. In a method for the production of iron and steel from iron ores in an open hearth furnace the steps of gradually supplying the iron ore and the flux onto the surface of a high carbonized iron melt maintained in said furnace in a molten state, reducing the iron ore continuously by the carbon of the iron melt, continuously replacing the carbon contents of the iron melt by means of a vertically adjustable carbon rod reaching into said iron melt and tapping the reduced iron and the formed slag from the furnace.

2. In a method according to claim 1, the step of blowing by means of reducing gases during the reduction of the iron ore coal dust onto the slag, said coal dust being thereby entered into the iron bath.

3. In a method for the production of iron and steel from iron ores in an open hearth furnace, the steps of gradually supplying the iron ore and the flux onto the surface of a high-carbonized iron melt maintained in said furnace in a molten state, reducing the iron continuously by the carbon of the iron melt, continuously replacing the carbon contents of the iron melt by means of a vertically adjustable carbon rod reaching into said iron melt and periodically tapping the reduced iron and the formed slag from the furnace.

4. In a method for the production of iron and steel from iron ores in an open hearth furnace, the steps of gradually supplying the iron ore and the flux onto the surface of a high-carbonized iron melt maintained in said furnace at a molten state, reducing the iron continuously by the carbon of the iron melt, continuously replacing the carbon contents of the iron melt by means of a vertically adjustable carbon rod reaching into said iron melt and continuously tapping the reduced iron and the formed slag from the furnace.

5. In a method for the production of iron and steel from iron ores in an open hearth furnace, the steps of gradually supplying the iron ore and the flux onto the surface of a high-carbonized iron melt maintained in said furnace in a molten state, reducing the iron ore continuously by the carbon of the iron melt, continuously replacing the carbon contents of the iron melt by means of a vertically adjustable carbon rod reaching into said melt, tapping the reduced iron and lifting said vertically adjustable carbon rod prior to said tapping at such a timely rate from the melt that the latter is reduced to the desired carbon contents by additionally supplied ore and thereupon tapping the iron while maintaining a molten sump of a sufficient height to enable reentrance of the carbon rod after completion of the tapping.

6. In a method according to claim 5, the use of a tiltable Siemens-Martin furnace.

References Cited in the file of this patent

UNITED STATES PATENTS

| Re. 3,096 | Martin | Aug. 25, 1868 |
| 98,139 | Adams | Dec. 21, 1869 |
| 453,227 | Wilson | June 2, 1891 |
| 608,779 | Karyscheff | Aug. 9, 1898 |
| 1,255,191 | McDonald | Feb. 5, 1918 |
| 1,796,871 | Madorsky | Mar. 17, 1931 |

FOREIGN PATENTS

| 503,587 | Belgium | June 15, 1951 |